US 7,769,797 B2

(12) United States Patent
Cho et al.

(10) Patent No.: US 7,769,797 B2
(45) Date of Patent: Aug. 3, 2010

(54) APPARATUS AND METHOD OF MULTIPLICATION USING A PLURALITY OF IDENTICAL PARTIAL MULTIPLICATION MODULES

(75) Inventors: Won-kyoung Cho, Jeonju-si (KR); Jung-wook Kim, Seoul (KR); In-cheol Park, Daejon Metropolitan (KR); Eul-hwan Lee, Seoul (KR); Hyeong-ju Kang, Daejeon Metropolitan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 980 days.

(21) Appl. No.: 11/037,547

(22) Filed: Jan. 19, 2005

(65) Prior Publication Data

US 2005/0182813 A1    Aug. 18, 2005

(30) Foreign Application Priority Data

Jan. 20, 2004   (KR) ............... 10-2004-0004449
Nov. 11, 2004   (KR) ............... 10-2004-0091907

(51) Int. Cl.
*G06F 7/523* (2006.01)
(52) U.S. Cl. ................................. 708/625
(58) Field of Classification Search ............ 708/625
See application file for complete search history.

(56) References Cited

U.S. PATENT DOCUMENTS

| 4,868,778 A | * | 9/1989 | Disbrow ............... 708/625 |
| 5,181,185 A |   | 1/1993 | Han et al. ............. 364/760 |
| 5,524,090 A | * | 6/1996 | Iwamura .............. 708/625 |
| 5,751,622 A | * | 5/1998 | Purcell ................ 708/625 |
| 6,286,024 B1 | * | 9/2001 | Yano et al. ............ 708/625 |
| 6,460,064 B1 | * | 10/2002 | Lee .................... 708/518 |
| 6,557,022 B1 |   | 4/2003 | Sih et al. .............. 708/523 |
| 6,742,012 B2 |   | 5/2004 | Nancekievill ........... 708/625 |
| 2001/0037352 A1 | * | 11/2001 | Hong ................. 708/625 |
| 2001/0044816 A1 | * | 11/2001 | Yano et al. ............ 708/620 |

FOREIGN PATENT DOCUMENTS

| JP | 06-274317     | 9/1994 |
| JP | 07-084763     | 3/1995 |
| JP | 07-141148     | 6/1995 |
| JP | 07-160476     | 6/1995 |
| JP | 08-234964     | 9/1996 |
| JP | 09-311779     | 12/1997 |
| KR | 10-2000-0031035 A | 6/2000 |
| KR | 2003-0047523  | 6/2003 |
| KR | 2003-0049180  | 6/2003 |
| WO | 00/38047      | 6/2000 |

* cited by examiner

*Primary Examiner*—David H Malzahn
(74) *Attorney, Agent, or Firm*—Roylance, Abrams, Berdo and Goodman, LLP

(57) ABSTRACT

A multiplication apparatus including a multiplier and multiplicand extractor for dividing the multiplicand into partial multiplicands and dividing the multiplier into partial multipliers, and for generating partial input pairs by combining the partial multiplicands with the partial multipliers, and a multiplication executor including identical partial multiplication modules for receiving the partial input pairs and outputting partial carries and partial products. The apparatus further includes an output generator for combining the partial carries with the partial products according to the execution instruction to generate a final output. For simple multiplications, each of the partial multiplication modules can pass data to and from an adjacent partial multiplication module to calculate the partial carry and the partial product, and pass bits exceeding its own multiplication coverage.

20 Claims, 13 Drawing Sheets

APPARATUS AND METHOD OF MULTIPLICATION USING A PLURALITY OF IDENTICAL PARTIAL MULTIPLICATION MODULES

CROSS-REFERENCE TO RELATED APPLICATIONS

This application claims the benefit under 35U.S.C. §119(a) of Korean Patent Application No. 10-2004-0004449 filed in the Korean Intellectual Property Office on Jan. 20, 2004, and Korean Patent Application No. 10-2004-0091907 filed in the Korean Intellectual Property Office on Nov. 11, 2004, the entire disclosures of each of which are hereby incorporated by reference.

BACKGROUND OF THE INVENTION

1. Field of the Invention:

The present invention relates to a digital multiplication apparatus. More particularly, the present invention relates to a multiple multiplication apparatus having a reduced size, which is suitable for implementation in semiconductor devices.

2. Description of the Related Art

As multimedia applications continue to become more popular, various data processing techniques continue to be introduced. Thus, simple multiplication devices dealing with two inputs are required to be capable of dealing with inputs of various bit sizes and outputting many multiplication results of various bit sizes. Therefore, a multiple multiplication apparatus which performs a variety of types of multiplications is widely used.

Conventional multiple multiplication apparatuses typically select one of a number of multiplication operations according to an execution instruction and perform the selected operation. It is beneficial to use multiple multiplication apparatuses because it is possible to perform many multiplications with one apparatus without requiring many separate multiplication apparatuses implemented in the hardware.

However, conventional multiple multiplication apparatuses select one result according to the execution instruction resulting from individual hardware logics embedded therein. It is inevitable therefore, that the hardware area and power consumption increases as the number of multiplications that the apparatus handles increases because conventional multiplication apparatuses use embedded individual hardware logics.

FIG. 1 schematically illustrates the operation of a conventional multiplication module. The multiplication module 105 in FIG. 1 receives an n-bit multiplier and an m-bit multiplicand and outputs an (m+n−1)-bit result, as well as a 1-bit carry. The output carry and result can also be input to other devices.

FIG. 2 is a block diagram illustrating a conventional multiple multiplication apparatus. The multiple multiplication apparatus includes k separate multiplication modules 252, 254, 256 and 258 for performing k separate multiplications, wherein k is a positive integer. Multiplicands and multipliers are extracted in a multiplier and multiplicand extractor 210 according to the execution instruction, and are then input into a plurality of multiplication modules 252, 254, 256 and 258. One of the multiplication modules is selected by the execution instruction to provide a result for the output generator 290. That is, in the conventional multiple multiplication apparatus, only one multiplication result is selected by the output generator 290. FIG. 3 shows the operation in greater detail.

FIG. 3 illustrates a multiplication operation performed in a conventional multiple multiplication apparatus.

At a first step, the execution instruction is fetched and decoded in the multiplier and multiplicand extractor. The multiplier and multiplicand extractor decodes the execution instruction and identifies the multiplication to be performed. Then, the multiplier and multiplicand extractor extracts the multiplicand and multiplier required in a multiplication module specified by the execution instruction, and delivers the extracted multiplicand and multiplier to the multiplication module. Finally, the multiplication module performs the multiplication using the extracted multiplicand and multiplier and outputs the result.

FIG. 4 is a block diagram illustrating the operation of the conventional multiple multiplication apparatus in more detail. As shown in FIG. 4, the conventional multiple multiplication apparatus includes 4 different multiplication modules 420, 440, 460 and 480. The multiplication modules generate carries CARRY1, CARRY2, CARRY3 and CARRY4, and multiplication results SUM1, SUM2, SUM3 and SUM4, respectively, which are then each delivered to an output generator 490. The multiplier and multiplicand extractor 410 fetches and decodes an execution instruction to select a desired multiplication module to perform multiplication.

The multiplier and multiplicand extractor 410 shown in FIG. 4 generates input pairs which each have 32×16, 16×16, 8×16 and 8×8 bit numbers according to the execution instruction, respectively. Then, each multiplication module performs the multiplication assigned to it and outputs the result. An output generator selects one 48-bit result from the 4 multiplied results as the final result. Data bits of the output of the multiplication module higher than a 16th bit can be ignored since the final result is to be expressed in 48 bits, while the outputs of each of the multiplication modules are expressed in 32 bits. The final result is selected based on the execution instruction.

However, the conventional multiple multiplication apparatus includes different multiplication modules which perform different multiplications. That is, two 16×16 multiplication modules, four 8×16 multiplication modules, or four 8×8 multiplication modules are required. Therefore, the hardware area of the conventional multiplication apparatus is increased as the number of multiplications to be performed increases and results in difficulties when attempting to minimize the size of the apparatus. Furthermore, the number of logic gates required to perform the various multiplications also increases, which results in a larger power consumption.

Accordingly, a need exists for a multiple multiplication apparatus which has a reduced size and reduced power consumption.

SUMMARY OF THE INVENTION

It is therefore, an object of the present invention to provide a multiple multiplication apparatus which performs various multiplications with a reduced hardware size. It is another object of the present invention to provide a multiple multiplication apparatus which decreases a number of embedded logic gates to minimize power consumption. The present invention solves the above and other problems, and provides a multiplication method and apparatus which performs various multiplications with reduced hardware size.

According to an aspect of the present invention, a multiplication apparatus is provided having a plurality of identical partial multiplication modules for receiving a multiplicand having m bits, wherein m is a positive integer, and a multiplier having n bits, wherein n is a positive integer, and for performing multiplications according to an execution instruction to generate a multiplication output. The multiplication apparatus comprises a multiplier and multiplicand extractor for dividing the multiplicand into k partial multiplicands, wherein k is a positive number, dividing the multiplier into l partial multipliers, wherein l is a positive number, and generating k partial input pairs by combining the partial multiplicands with respective partial multipliers. The multiplication apparatus further comprises a multiplication executor including k identical partial multiplication modules for receiving the respective k partial input pairs and respectively outputting k partial carries and k partial products, and an output generator for combining the k partial carries with the k partial products according to the execution instruction to generate a final output.

Preferably, the multiplier and multiplicand extractor determines whether the multiplication indicated by the execution instruction is an unsigned multiplication, and deactivates sign bits of the partial multiplicands and the partial multipliers to 0 when the multiplication is determined to be an unsigned multiplication, and performs sign-extension by adding sign bits to the partial multiplicands and the partial multipliers when the multiplication is determined to be a signed multiplication.

Preferably, the multiplier and multiplicand extractor further divides the multiplicand into k partial multiplicands $MCD(1), MCD(2), \ldots, MCD(k)$ each having a size of m/k bits in a descending order from the most significant bit (MSB) of the multiplicand to the least significant bit (LSB) of the multiplicand, divides the multiplier into l partial multipliers $MER(1), MER(2), \ldots, MER(l)$ each having a size of n/l bits in a descending order from the most significant bit (MSB) of the multiplier to the least significant bit (LSB) of the multiplier, and generates partial input pairs. The partial input pairs are preferably generated by combining a p-th partial multiplicand with a q-th multiplier, wherein p satisfies $p \leq k$ and q satisfies $q \leq l$, and wherein p and q are increased by 1 until p reaches k or until q reaches l. The values p and q are then initialized after p reaches k or after q reaches l.

Preferably, when the multiplication indicated by the execution instruction is simple multiplication, each of the partial multiplication modules having respective multiplication coverages use inside multiplication vectors generated by bit-wise multiplying the partial multiplicand by the partial multiplier and which are passed downward from an adjacent partial multiplication module having a multiplication coverage higher than its own multiplication coverage to calculate the partial carry and the partial product. Each partial multiplication module passes upward bits of the partial carry exceeding its own multiplication coverage to the adjacent partial multiplication module having a multiplication coverage higher than its own multiplication coverage. The output generator then combines the partial products received from each of the partial multiplication modules according to the corresponding multiplication coverages to generate the final output.

Preferably, each of the partial multiplication modules includes an adder for adding the inside multiplication vectors, wherein the adder pads the inside multiplication vector with the inside multiplication vector passed down from the adjacent partial multiplication module having a multiplication coverage higher than its own multiplication coverage to make the inside multiplication vectors have the same order of most significant bits (MSBs), and further adds the padded inside multiplication vectors.

In another aspect of the present invention, a multiplication method is provided for use with a multiplicand having m bits, wherein m is a positive integer, and a multiplier having n bits, wherein n is a positive integer, for performing multiplication according to an execution instruction to generate a final output. The multiplication method comprises the steps of extracting a multiplier and a multiplicand, dividing the multiplicand into k partial multiplicands, wherein k is a positive number, dividing the multiplier into l partial multipliers, wherein l is a positive number, and generating k partial input pairs by combining the partial multiplicands with the respective partial multipliers. The method further comprises the steps of performing multiplication to perform a partial multiplication operation using the k partial input pairs and outputting k partial carries and k partial products, and then generating a final output combining the k partial carries with the k partial products according to the execution instruction to generate the final output.

Preferably, the step of extracting a multiplier and a multiplicand comprises the steps of determining whether the multiplication indicated by the execution instruction is unsigned multiplication, and deactivating sign bits of the partial multiplicands and the partial multipliers to 0 when the multiplication is determined to be unsigned multiplication, and performing sign extension by adding sign bits to the partial multiplicands and the partial multipliers when the multiplication is determined to be signed multiplication.

Preferably, when the multiplication indicated by the execution instruction is simple multiplication, each of the partial multiplication operations having respective multiplication coverages use inside multiplication vectors, each of which is generated by bit-wise multiplying the partial multiplicand by the partial multiplier and which are passed downward from an adjacent partial multiplication operation having a multiplication coverage higher than its own multiplication coverage to calculate the partial carry and the partial product. Each partial multiplication operation further passes upward bits of the partial carry exceeding its own multiplication coverage to the adjacent partial multiplication operation having a multiplication coverage higher than its own multiplication coverage. The method further comprises steps for generating the final output by combining the partial products received from each of the partial multiplication operations according to the corresponding multiplication coverages to generate the final output.

Preferably, the multiplication coverages are defined such that the lowest multiplication coverage is $[0, n+m/k-2]$, and the remaining multiplication coverages have a size of m/k bits in an increasing order from a bit adjacent to the MSB of an adjacent lower multiplication coverage.

Preferably, the multiplier and multiplicand extractor further provide steps to divide the multiplicand into k partial multiplicands $MCD(1), MCD(2), \ldots, MCD(k)$, each having a size of m/k bits, in a descending order from the MSB to the LSB, and generate partial input pairs by combining a p-th partial multiplicand with a q-th multiplier, wherein p satisfies $p \leq k$ and q satisfies $q \leq l$, and wherein p and q are increased by 1 until p reaches k or until q reaches l.

According to an aspect of the present invention, a multiple multiplication apparatus is further provided which has large scale integration of semiconductor devices since the area of the multiplication modules embedded in a digital signal processor (DSP) is reduced.

According to another aspect of the present invention, a multiple multiplication apparatus is further provided which embeds small numbers of logic gates and consumes less power to achieve desired results.

BRIEF DESCRIPTION OF THE DRAWINGS

The above and other features and advantages of the present invention will become more apparent by describing in detail exemplary embodiments thereof with reference to the attached drawings in which.

Throughout the drawings, like reference numerals will be understood to refer to like parts, components and structures.

DETAILED DESCRIPTION OF EXEMPLARY EMBODIMENTS

Figure 5:
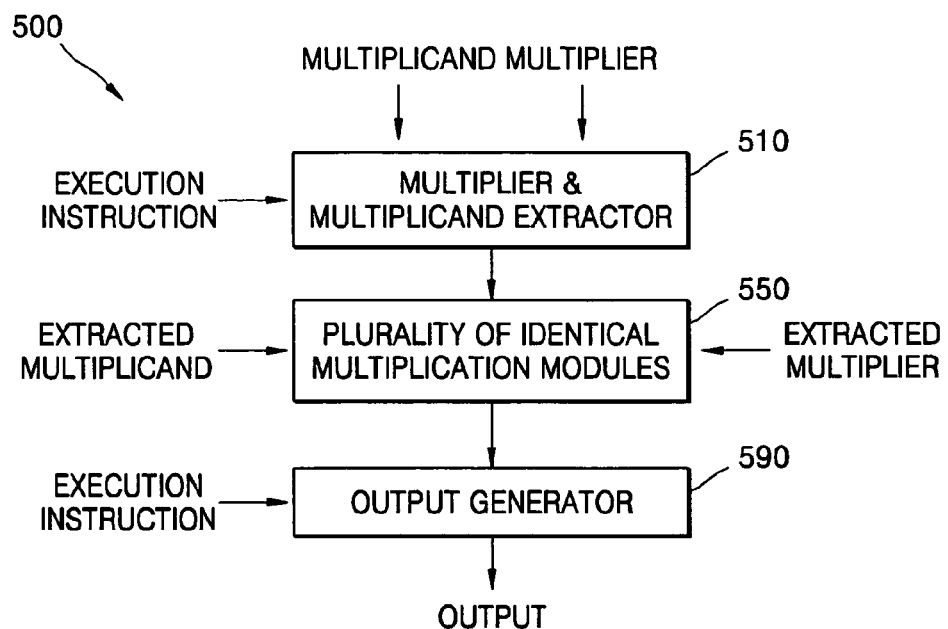
FIG. 5 is a block diagram illustrating a multiple multiplication apparatus according to an embodiment of the present invention.

FIG. 5 is a block diagram illustrating a multiple multiplication apparatus according to an embodiment of the present invention. The multiple multiplication apparatus 500 in FIG. 5 includes a multiplier and multiplicand extractor 510, a multiplication executor 550 and an output generator 590. The multiplication executor 550 includes a plurality of identical multiplication modules.

The multiplier and multiplicand extractor 510 receives and decodes an execution instruction and extracts a multiplicand and multiplier suited for the multiplication specified by the execution instruction. The operation of the multiplier and multiplicand extractor 510 will be described in greater detail below.

The multiplicand and multiplier extracted in the multiplier and multiplicand extractor 510 are input to the identical multiplication modules included in the multiplication executor 550. Each of the identical multiplication modules performs multiplication using the multiplicand and multiplier, and delivers the result to the output generator 590. The output generator 590 either selects one result identified by the execution instruction, or combines the results according to the execution instruction to generate a final result. The operation of the output generator 590 will also be described in greater detail below.

As shown in FIG. 5, the multiple multiplication apparatus 500 according to an embodiment of the present invention uses the plurality of identical multiplication modules by first extracting a multiplicand and multiplier to be input to each of the multiplication modules according to the execution instruction, and then combining separate results from the multiplication modules to obtain the final result.

Figure 6:
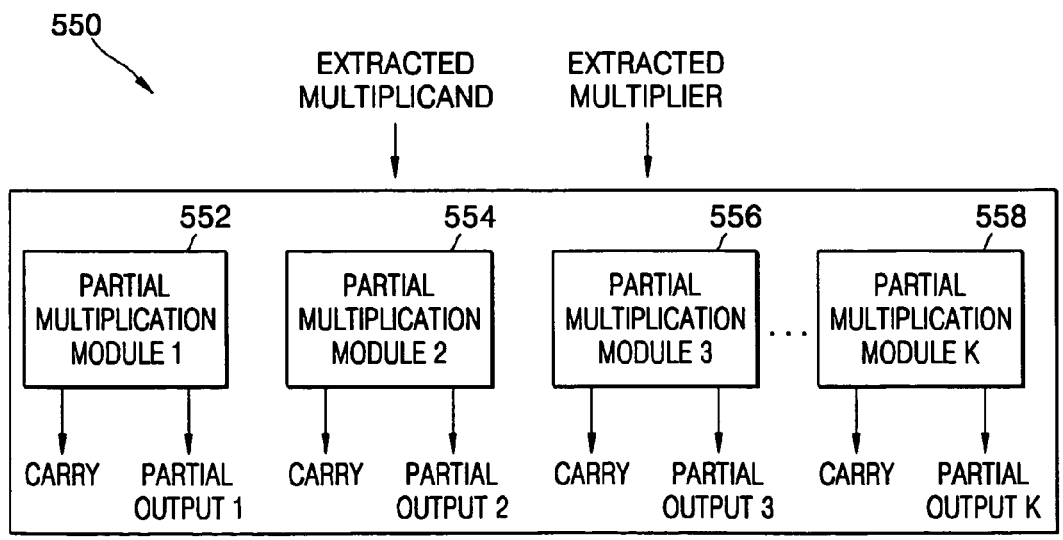
FIG. 6 is a diagram to illustrate a multiplication executor of FIG. 5 in greater detail.

FIG. 6 shows a multiplication executor 550 of FIG. 5 in greater detail. The multiplication executor 550 shown in FIG. 6 includes 1 through k identical partial multiplication modules 552, 554, 556 and 558, wherein k is a positive integer. As provided herein, the result of partial multiplications is partial sums and partial carries. A partial sum is combined with a partial carry to form a partial product.

As noted above, the multiplicand and multiplier provided to the partial multiplication modules 552, 554, 556 and 558 are extracted by the multiplier and multiplicand extractor 510 in FIG. 5. Each of the partial multiplication modules 552, 554, 556 and 558 outputs a carry and a partially multiplied result. The multiplication executor 550 shown in FIG. 6 includes identical partial multiplication modules instead of different multiplication modules as in the conventional art. Therefore, the area of the multiplication apparatus according to the embodiment of the present invention shown in FIG. 6 is reduced as compared with the conventional multiplication apparatus.

Figure 7:
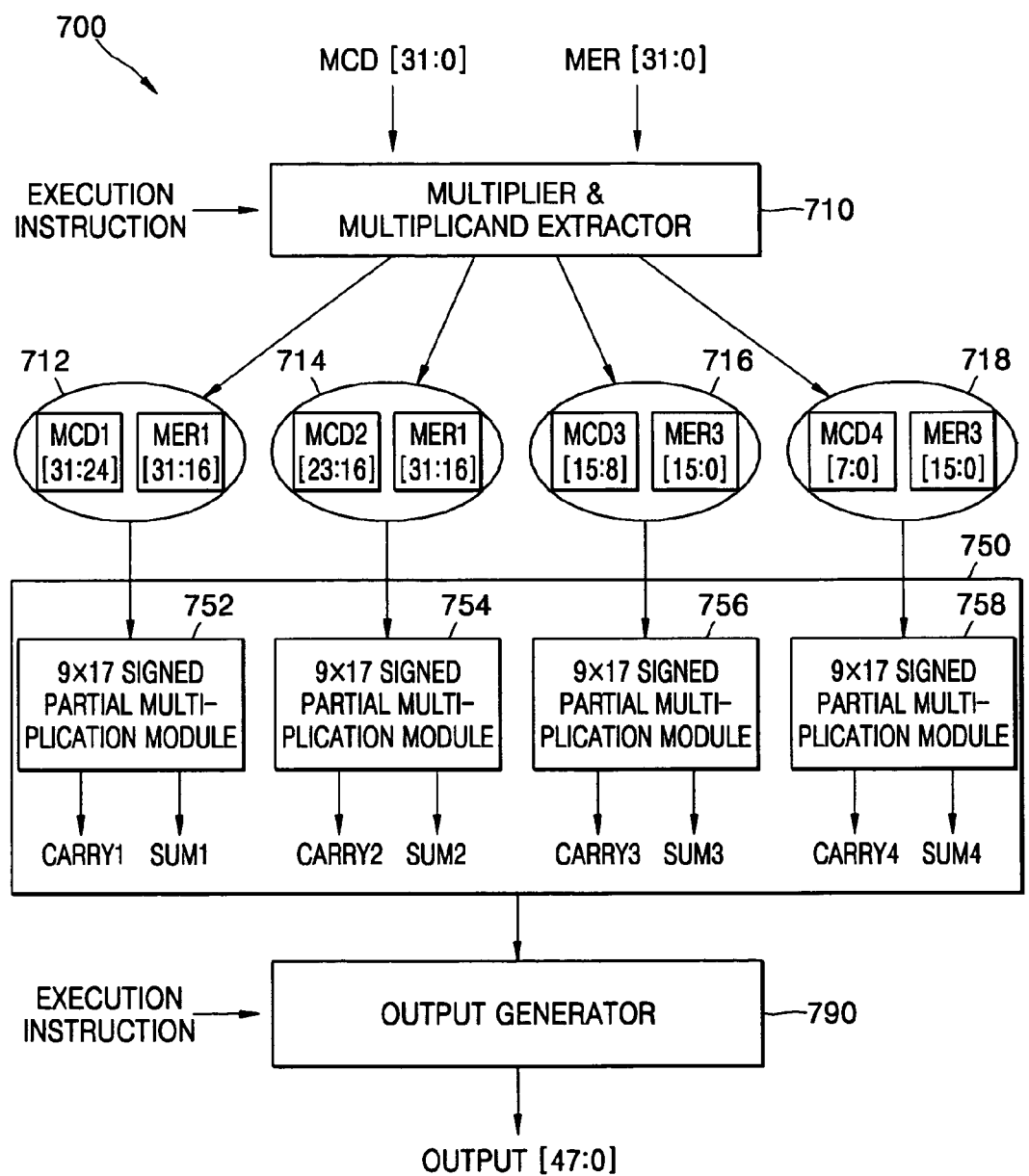
FIG. 7 is a diagram to illustrate the operation of the multiple multiplication apparatus according to an embodiment of the present invention.

FIG. 7 illustrates the operation of the multiple multiplication apparatus according to an embodiment of the present invention. The multiple multiplication apparatus 700 shown in FIG. 7 includes a multiplier and multiplicand extractor 710, a multiplication executor 750, and an output generator 790. The multiplication executor 750 included in the multiple multiplication apparatus 700 shown in FIG. 7 includes four 9×17 signed partial multiplication modules 752, 754, 756 and 758. The multiplier and multiplicand extractor 710 extracts the multiplicand and multiplier to be input to the signed partial multiplication modules 752, 754, 756 and 758, and generates first through fourth partial input pairs 712, 714, 716 and 718.

Each of the partial multiplication modules 752, 754, 756 and 758 provides carries CARRY1, CARRY2, CARRY3 and CARRY4, and partially multiplied results SUM1, SUM2, SUM3 and SUM4 to the output generator 790. The output generator 790 combines the carries CARRY1, CARRY2, CARRY3 and CARRY4, and the partially multiplied results SUM1, SUM2, SUM3 and SUM4 to form a result identified by the execution instruction.

To simplify the explanation, an example operation can be presented. It can be assumed for illustrating the example, that the multiple multiplication apparatus 700 shown in FIG. 7 receives a multiplicand MCD [31:0] and a multiplier MER [31:0], and generates one output [47:0]. This assumption is not intended to narrow the scope of the present invention, since it is provided as an example only. In the above, the operator [A:B] denotes a bit stream from a B-th bit to an A-th bit starting from a least significant bit (LSB) of each data. For example, [4:0] selects a $0^{th}$ bit (LSB) to a $4^{th}$ bit (MSB) of a data stream.

The multiplier and multiplicand extractor 710 receives a multiplicand [31:0], a multiplier [31:0] and an execution instruction, and generates partial input pairs 712, 714, 716 and 718, which are input to the partial multiplication modules 752, 754, 756 and 758, respectively. The multiplier and multiplicand extractor 710 divides the multiplicand into two parts and divides the multiplier into four parts. When a 16-bit input is used, the multiplier and multiplicand extractor 710 can use the lower 16 bits from the multiplier and the multiplicand as they are. When an 8-bit input is used, the multiplier and multiplicand extractor 710 can then divide the multiplier and the multiplicand into four parts. Furthermore, when the multiplication indicated by the execution instruction is an unsigned one, the multiplier and multiplicand extractor 710 can perform 0-padding by inserting 0's into the MSB positions of the multiplicands and multipliers. Alternatively, the multiplier and multiplicand extractor 710 can perform sign-extension when the multiplication indicated by the execution instruction is a signed one.

In FIG. 7, the multiplier and multiplicand extractor 710 divides the multiplicand into four parts to generate 4 partial multiplicands MCD1 [31:24], MCD2 [23:16], MCD3 [15:8] and MCD4 [7:0]. Accordingly, the multiplier and multiplicand extractor 710 divides the 32-bit multiplier into 2 parts to generate 2 partial multipliers MER1 [31:16] and MER3 [15:0]. In order to generate four input pairs, the partial multipliers MER1 [31:16] and MER3 [15:0] are used twice. Then, the multiplier and multiplicand extractor 710 combines the divided parts of the multiplicands and the multipliers to generate first through fourth input pairs. The multiplier and multiplicand extractor 710 generates the partial input pairs as described in greater detail below.

First, the multiplicand is divided to k partial multiplicands MCD(1), MCD(2), MCD(k), each sequentially having m/k bits from the order of the MSB. The multiplier is divided to l partial multipliers MER(1), MER(2), . . . , MER(l), each sequentially having n/l bits from the order of the MSB. Here, m and l are bit numbers of the multiplicand and the multiplier, respectively. Then, a p-th partial multiplicand and a q-th partial multiplier are combined to generate a partial input pair. Then, p and q are increased by one until they reach k and l, respectively, at which point p and q are then initialized. Here p is a positive integer satisfying $p \leq k$, while q is a positive integer satisfying $q \leq l$. It is to be understood that the present invention is not limited to the embodiment shown in FIG. 7, and it is possible to generate any number of various input pairs using the partial multiplicands and the partial multipliers.

The partial input pairs 712, 714, 716 and 718 are generated as described in greater detail below. As noted above, the multiplier and multiplicand extractor 710 divides the multiplicand into four parts to generate 4 partial multiplicands MCD1 [31:24], MCD2 [23:16], MCD3 [15:8] and MCD4 [7:0]. The multiplier and multiplicand extractor 710 also divides the 32-bit multiplier into 2 parts to generate 2 partial multipliers MER1 [31:16] and MER3 [15:0]. In order to generate four input pairs, the partial multipliers MER1 [31:16] and MER3 [15:0] are used twice. The first partial input pair 712 consists of the first part of the multiplicand MCD1 [31:24] and the first part of the multiplier MER1 [31:16]. The second partial input pair 714 consists of the second part of the multiplicand MCD2 [23:16] and the first part of the multiplier MER1 [31:16]. The third partial input pair 716 consists of the third part of the multiplicand MCD3 [15:8] and the second part of the multiplier MER3 [15:0]. The fourth partial input pair 718 consists of the fourth part of the multiplicand MCD4 [7:0] and the second part of the multiplier MER3 [15:0]. The partial input pairs 712, 714, 716 and 718 are then input to the signed partial multiplication modules 752, 754, 756 and 758, respectively, included in the multiplication executor 750.

The results of the partial multiplication modules 752, 754, 756 and 758 are expressed in vectors to form four carry vectors CARRY1, CARRY2, CARRY3 and CARRY4, and four partially multiplied result vectors SUM1, SUM2, SUM3 and SUM4. The partial multiplication modules 752, 754, 756 and 758 of the present invention output the carry vector and the partial multiplied result vector separately. By processing the carries CARRY1, CARRY2, CARRY3 and CARRY4, and the partially multiplied results SUM1, SUM2, SUM3 and SUM4 in vector form, multiplication speed increases. Since four partial multiplication modules 752, 754, 756 and 758 are used in the multiplication executor 750, four carry vectors CARRY1, CARRY2, CARRY3 and CARRY4, and four partially multiplied result vectors SUM1, SUM2, SUM3 and SUM4 are generated. Each of the partial multiplication modules 752, 754, 756 and 758 included in the multiplication executor 750 can perform multiplication using any suitable algorithm, such as a Wallace Tree algorithm, however, the multiplication algorithm is not limited to the Wallace Tree algorithm.

The output generator 790 performs a Carry Save Adder (CSA) algorithm on the four carry vectors CARRY1, CARRY2, CARRY3 and CARRY4, and the four partially multiplied result vectors SUM1, SUM2, SUM3 and SUM4, and generates a final output. For example, in a 32×16 or 16×16 multiplication, the vectors are divided into more than two parts and are added to form the final result. The LSB is used to compensate for any error due to the sign extension of the multipliers.

As noted above, the conventional output generator selects one result from the multiplication results of the respective partial multiplication modules based on the execution instruction. However, the output generator 790 of the present invention combines the received partially multiplied results to generate various results rather than select one from them. For example, the output generator 790 can sequentially shift each of the first through fourth partially multiplied results SUM1, SUM2, SUM3 and SUM4, each of which is a 24-bit bit number, by 8 bits and add the results to generate a desired 48-bit output. That is, the third partially multiplied result which is shifted by 8 bits can be added to the fourth multiplied result SUM4, a second partial multiplied result which is shifted by 16 bits can be added to the previous result, and the first multiplied result shifted by 24 bits can be added to the previous result to form the final result.

The conventional multiple multiplication apparatus requires 4 times the area of a 32×16 multiplier to perform the operation shown in FIG. 7. However, the multiple multiplication apparatus according to embodiments of the present invention comprises four 9×17 multipliers, and has an area similar to that of one 32×16 multiplier, so that the hardware area is reduced. Accordingly, the power consumption is also reduced to ¼ that of conventional multiple multiplication apparatus.

Figure 8:
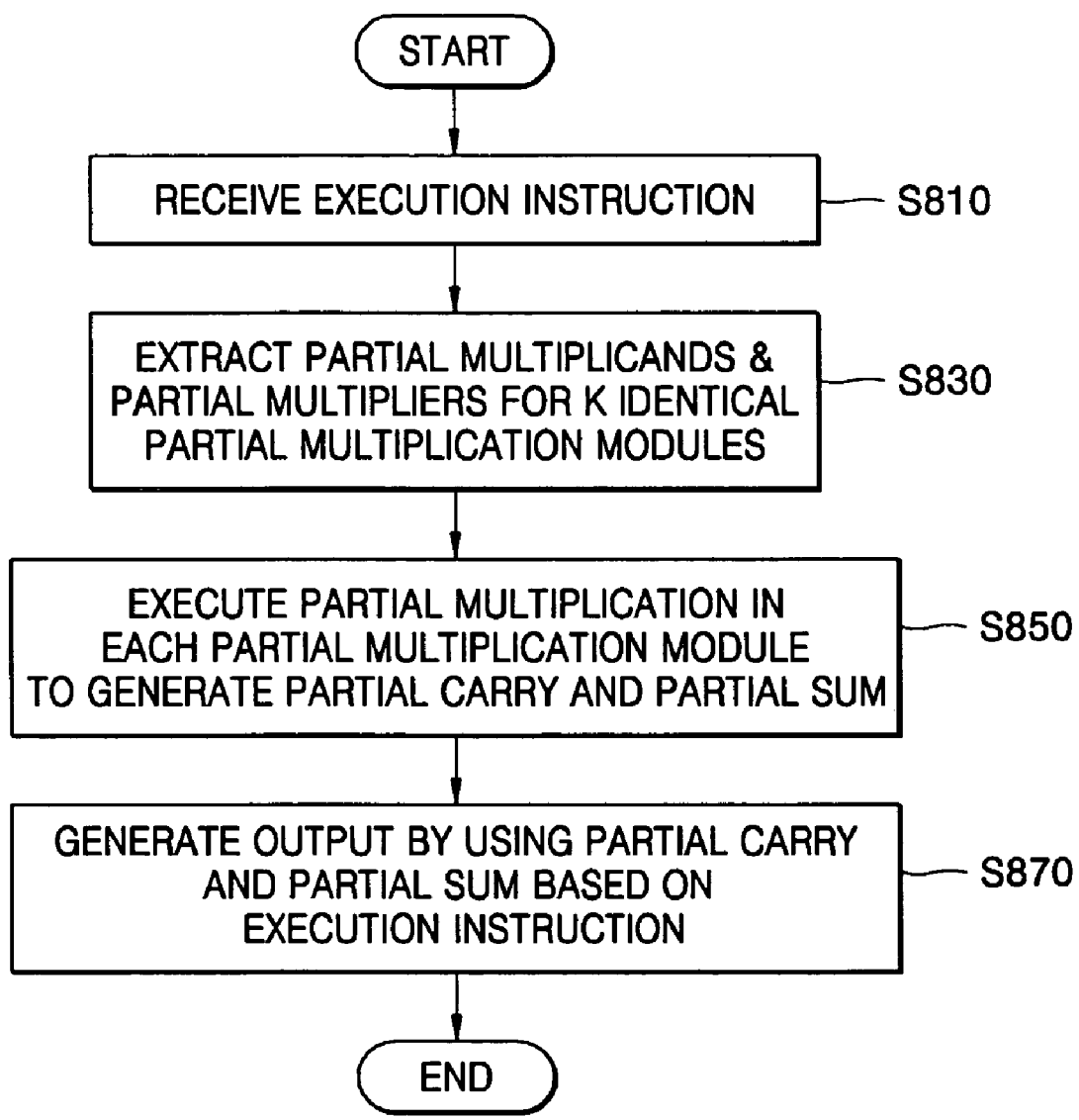
FIG. 8 is a flowchart illustrating a multiple multiplication method according to an embodiment of the present invention.

FIG. 8 is a flowchart illustrating a multiple multiplication method according to another embodiment of the present invention.

First, an execution instruction is received in step S810. Then, the execution instruction is decoded and a required multiplication is selected.

In step S830, partial multipliers and partial multiplicands to be provided to k partial multiplication modules are extracted according to the decoded execution instruction. As noted above, the partial multipliers and partial multiplicands are divided and/or combined in various ways and provided to the partial multiplication modules.

The partial multiplication modules then generate partial carries and partially multiplied results in step S850. The partial carries and partially multiplied results are provided to an output generator in a vector form.

The output generator then combines the carry vector and the partially multiplied result vector based on the execution instruction and generates a final result in step S870.

Figure 9:
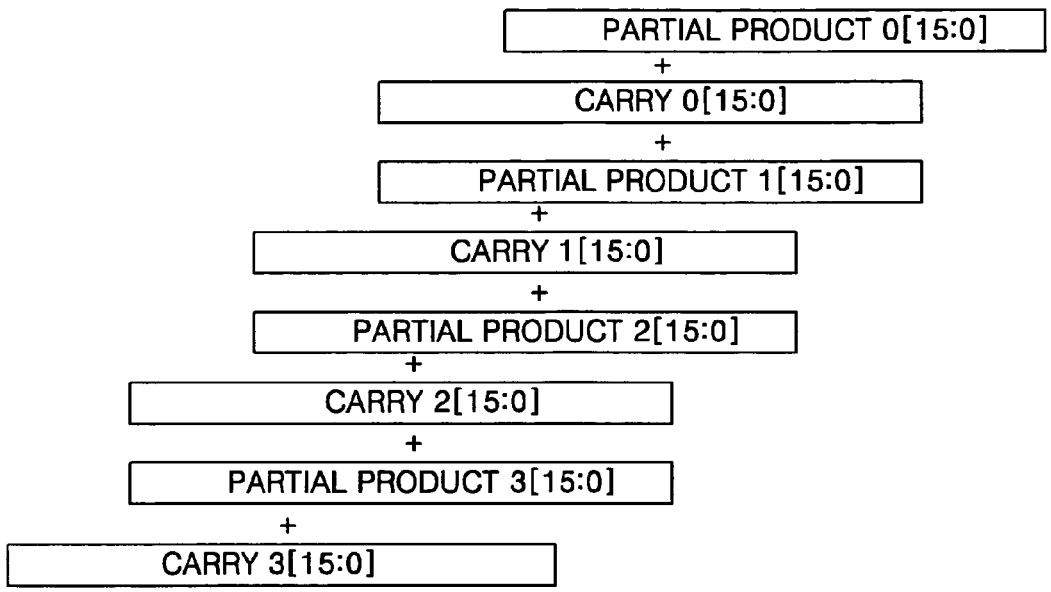
FIG. 9 is a diagram to illustrate the addition of results of partial multiplication modules in another embodiment of the present invention performing simple multiplication.

FIG. 9 illustrates the adding of the results of the partial multiplication modules in another embodiment of the present invention when performing simple multiplication. Although the exemplary embodiment is shown applied to a simple multiplication, the present invention is not restricted to simple multiplications only. As shown in FIG. 9, partial products and partial carries generated in the partial multiplication modules are shifted differently and then added. The final result is formed by adding the differently shifted partial products and partial carries.

In performing simple multiplication as shown in FIG. 9, many adders are required to perform the addition. Therefore, another embodiment is illustrated and described in greater detail below in order to reduce the number of adders required.

Figure 10:
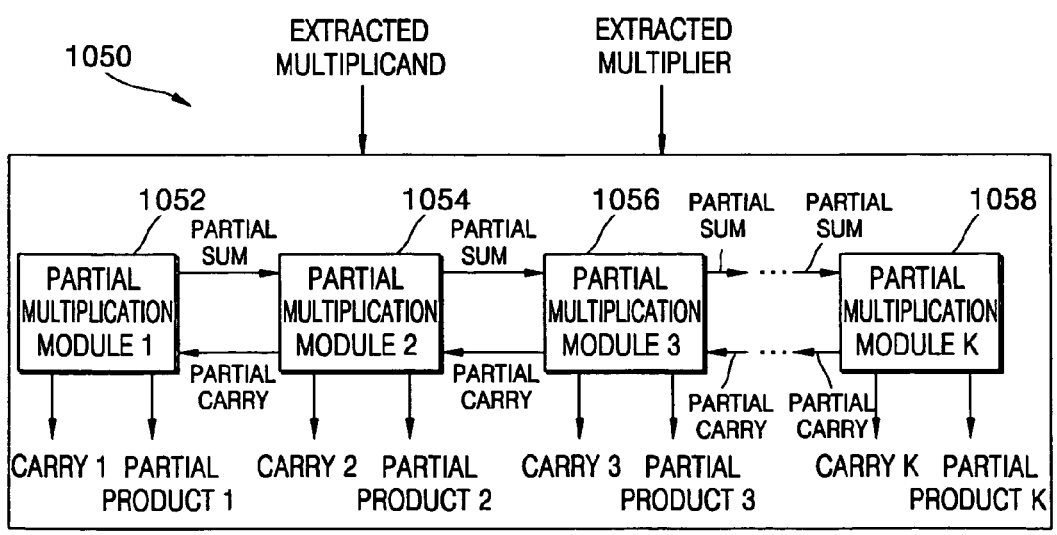
FIG. 10 is a diagram to illustrate a multiplication executor included in another embodiment of the present invention in greater detail.

FIG. 10 illustrates a multiplication executor included in another embodiment of the present invention in greater detail.

A multiplication executor 1050 in FIG. 10 includes first through fourth partial multiplication modules 1052, 1054, 1056 and 1058. Each of the partial multiplication modules 1052, 1054, 1056 and 1058 receives a corresponding partial pair to generate a partial product. When an execution instruction indicates a simple multiplication instruction, each of the partial multiplication modules 1052, 1054, 1056 and 1058 have a corresponding multiplication coverage. The multiplication coverage is assigned as follows.

The lowest and the first multiplication coverage is [0, n+m/k−2] and corresponds to the first partial multiplication module 1052. The second multiplication coverage is [15, 12], which has four bits starting from the 12th bit which is adjacent to the MSB of the first multiplication coverage [0, n+m/k−2], and corresponds to the second partial multiplication module 1054. Similarly, the third multiplication coverage is [19, 16] and corresponds to the third partial multiplication module 1056. Also, the fourth multiplication coverage is [23, 20] and corresponds to the fourth partial multiplication module 1058.

Each of the partial multiplication modules 1052, 1054, 1056 and 1058 then receives a partial sum passed downward from an adjacent partial multiplication module, which has a multiplication coverage higher than its own multiplication coverage, and calculates a partial carry and a partial product. As noted above, the result of partial multiplications is partial sums and partial carries. A partial sum is combined with a partial carry to form a partial product. Then, the partial multiplication module passes upward bits of the partial carry which exceed the corresponding multiplication coverage to the adjacent higher partial multiplication module. In this exemplary embodiment, the term 'partial sum' represents a bit stream (that is, inside multiplication vector) resulting from multiplying a multiplicand by a bit of a multiplier. Partial sums are added to generate a partial product. Then, the output generator combines the partial products received from the partial multiplication modules according to their multiplication coverages to generate the final output.

Each of the partial multiplication modules 1052, 1054, 1056 and 1058 include an adder to add n inside multiplication vectors resulting from the bit-wise multiplying of the partial multiplicand by the partial multiplier. For example, when a 16-bit multiplicand is divided into four partial multiplicands, each of the partial multiplication modules 1052, 1054, 1056 and 1058 generates 8 inside multiplication vectors resulting from the bit-wise multiplying of a received partial multiplicand by the 8-bit multiplier. Each inside multiplication vector is then bit-wise added to form a partial product.

The adder pads the inside multiplication vectors with the partial product passed downward from the adjacent partial multiplication module having a multiplication coverage higher than its own multiplication coverage to make the inside multiplication vectors have the same order of MSBs, and then adds the padded inside multiplication vectors. For providing an illustration of this operation, an example can be shown in which it can be assumed that three inside multiplication vectors have $8^{th}$, $9^{th}$ and $10^{th}$ order MSBs. Then, since the highest order of the MSBs of the inside multiplication vectors to be added is 10, inside multiplication vectors having $8^{th}$ and $9^{th}$ order MSBs pass downward one and two bits, respectively, from adjacent partial multiplication modules having higher multiplication coverage than its own so that they all have $10^{th}$ order MSBs. Then, all inside multiplication vectors have $10^{th}$ order MSBs.

The adder passes upward bits of its partial carry exceeding the corresponding multiplication coverage to an adjacent partial multiplication module having a higher multiplication coverage than its own. The bits of the partial carry which are passed upward are added to corresponding bits of the higher partial multiplication module.

By combining the bits of corresponding multiplication coverages, the final output is generated without performing separate adding operations.

The passing downward and passing upward operations, hereinafter referred to as passing down and passing up, will be described in greater detail below when referring to FIG. 15.

The multiplication executor 1050 can obtain the final multiplication output without adding partial products of each of the partial multiplication modules 1052, 1054, 1056 and 1058. Thus, the required hardware area is reduced and power consumption is minimized.

Figure 11:
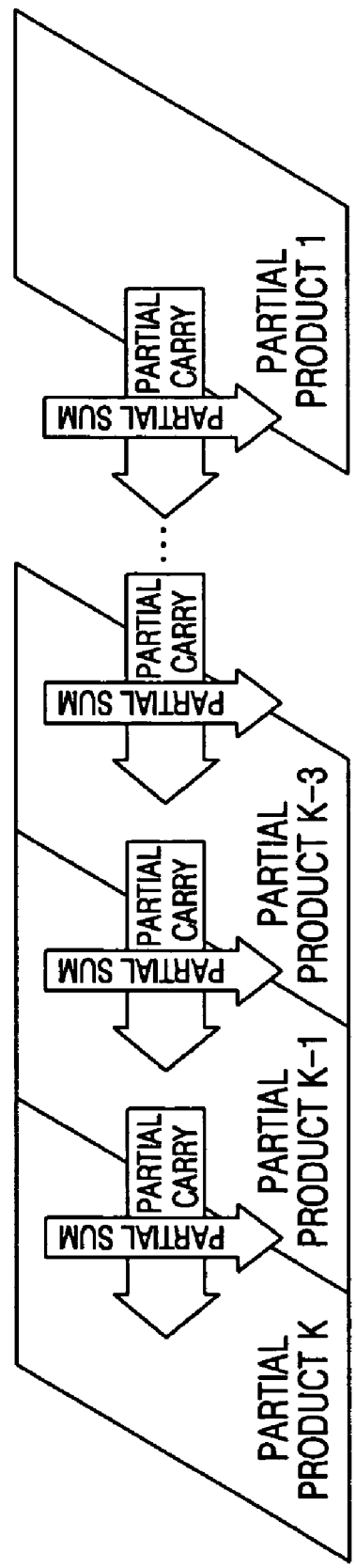
FIG. 11 is a diagram to illustrate inner partial product vectors generated in partial multiplication modules included in an embodiment of the present invention.

FIG. 11 illustrates inner partial product vectors generated in the partial multiplication modules included in an embodiment of the present invention.

In FIG. 11, each quadrilateral represents inside multiplication vectors resulting from the bit-wise multiplying of a partial multiplicand by a partial multiplier. A partial product 1 represents a result of the bit-wise adding of inside multiplication vectors resulting from multiplying the first partial multiplicand by the partial multiplier. Similarly, a partial product k represents a result of the bit-wise adding of inside multiplication vectors resulting from multiplying the k-th partial multiplicand by each bit of the partial multiplier. An adder included in a partial multiplication module according to an embodiment of the present invention receives bits passed down from a higher partial multiplication module in order to make the inside multiplication vectors to be added, each have the same order of MSBs. This passing down operation is represented using top-to-bottom arrows in FIG. 11. Some bits of partial carries exceeding corresponding multiplication coverages are passed up to a partial multiplication module having higher multiplication coverage. This passing up operation is represented using right-to-left arrows in FIG. 11.

In FIG. 11, the partial multiplication modules do not require a separate adding operation of partial products, since they use partial sums in their multiplication coverage which are passed down from an adjacent partial multiplication module to calculate their partial products.

Figure 12:
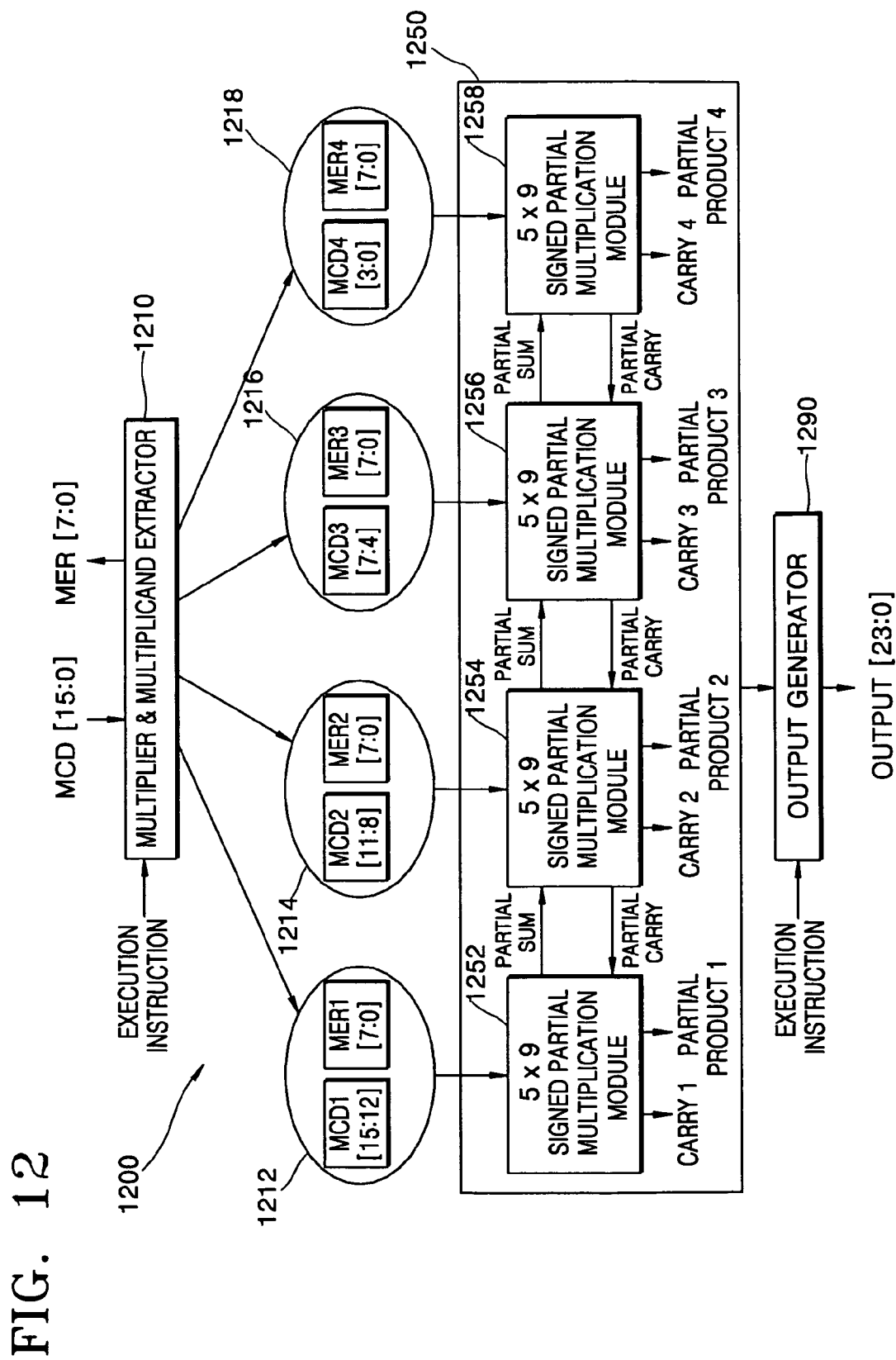
FIG. 12 is a diagram to illustrate a multiple multiplication apparatus according to another embodiment of the present invention in greater detail.

FIG. 12 illustrates a multiple multiplication apparatus according to another embodiment of the present invention in greater detail.

The multiple multiplication apparatus 1200 shown in FIG. 12 includes a multiplier and multiplicand extractor 1210, a multiplication executor 1250 and an output generator 1290. The multiplication executor 1250 included in the multiple multiplication apparatus 1200 shown in FIG. 12 includes four 5×9 signed partial multiplication modules 1252, 1254, 1256 and 1258. The multiplier and multiplicand extractor 1210 extracts the multiplicand and multiplier to be input to the signed partial multiplication modules 1252, 1254, 1256 and 1258, and generates first through fourth partial input pairs 1212, 1214, 1216 and 1218. Each of the partial multiplication modules 1252, 1254, 1256 and 1258 provides carries CARRY1, CARRY2, CARRY3 and CARRY4, and partially multiplied results SUM1, SUM2, SUM3 and SUM4 to the output generator 1290. The output generator 1290 combines the carries CARRY1, CARRY2, CARRY3 and CARRY4, and the partial multiplied results SUM1, SUM2, SUM3 and SUM4 to form a result identified by the execution instruction. To simplify the explanation, an example operation can be presented. It can be assumed for illustrating the example, that the multiple multiplication apparatus 1210 shown in FIG. 12 receives a multiplicand [15:0] and a multiplier [7:0] with which it generates one output [23:0]. This assumption is not intended to narrow the scope of the present invention, since this assumption is provided as an example only.

The multiplier and multiplicand extractor 1210 receives a multiplicand [15:0], a multiplier [7:0] and an execution instruction, and generates partial input pairs 1212, 1214, 1216 and 1218, which are input to the partial multiplication modules 1252, 1254, 1256 and 1258, respectively. The multiplier and multiplicand extractor 1210 divides the multiplicand into four parts. Furthermore, when the multiplication instructed by the execution instruction is an unsigned one, the multiplier and multiplicand extractor 1210 can perform 0-padding by inserting 0's into the MSBs of the multiplicands and multipliers. Alternatively, the multiplier and multiplicand extractor 1210 can perform sign-extension when the multiplication indicated by the execution instruction is a signed one. In FIG. 12, the multiplier and multiplicand extractor 1210 divides the multiplicand into four parts to generate four partial multiplicands MCD1 [15:12], MCD2 [11:8], MCD3 [7:4] and MCD4 [3:0].

The partial input pairs 1212, 1214, 1216 and 1218 are generated as described in greater detail below. The first partial input pair 1212 consists of the first part of the multiplicand MCD1 [15:12] and the partial multiplier MER1 [7:0]. The second partial input pair 1214 consists of the second part of the multiplicand MCD2 [11:8] and MER2 [7:0]. The third partial input pair 1216 consists of the third part of the multiplicand MCD3 [7:4] and MER3 [7:0]. The fourth partial input pair 1218 consists of the fourth part of the multiplicand MCD4 [3:0] and MER4 [7:0]. It is preferable that the multiplier is not divided when the execution instruction indicates a simple multiplication order. The partial input pairs 1212, 1214, 1216 and 1218 are then input to the signed partial multiplication modules 1252, 1254, 1256 and 1258, respectively, included in the multiplication executor 1250.

The multiplication executor 1250 combines the partial carries and partial products of the signed partial multiplication modules 1252, 1254, 1256 and 1258 to form a partial carry vector and a partial product vector. While performing simple multiplication, partial carries and partial sums are passed up and down between adjacent partial multiplication modules as described above.

The output generator 1290 then performs a Carry Save Adder (CSA) algorithm on the four carry vectors and four partial product vectors to generate a final output. For example, in a 32×16 or 16×16 multiplication, the vectors are divided into more than two parts and are added to form the final result. The LSB is used to compensate for any error due to a sign extension of the multipliers.

In a simple multiplication, the output generator 1290 simply combines the received partial products and partial carries, considering the multiplication coverages of the partial multiplication modules, to form the final output. For example, the output generator 1290 selects bits of the partial carry 1 and the partial product 1 generated by the first partial multiplication module 1252 which correspond to the first multiplication coverage [11:0] of the first partial multiplication module 1252. The output generator 1290 selects bits of the partial carry 2 and the partial product 2 generated by the second partial multiplication module 1254 which correspond to the second multiplication coverage [15:12] of the second partial multiplication module 1254. Similarly, the output generator 1290 selects bits of the partial carry 3 and the partial product 3 which correspond to the third multiplication coverage [19:16] of the third partial multiplication module 1256. The output generator 1290 selects bits of the partial carry 4 and the partial product 4 which correspond to the fourth multiplication coverage [23:20] of the fourth partial multiplication module 1258. Then, the output generator 1290 simply combines selected bits of partial carries and partial products to form the final result.

Figure 13:
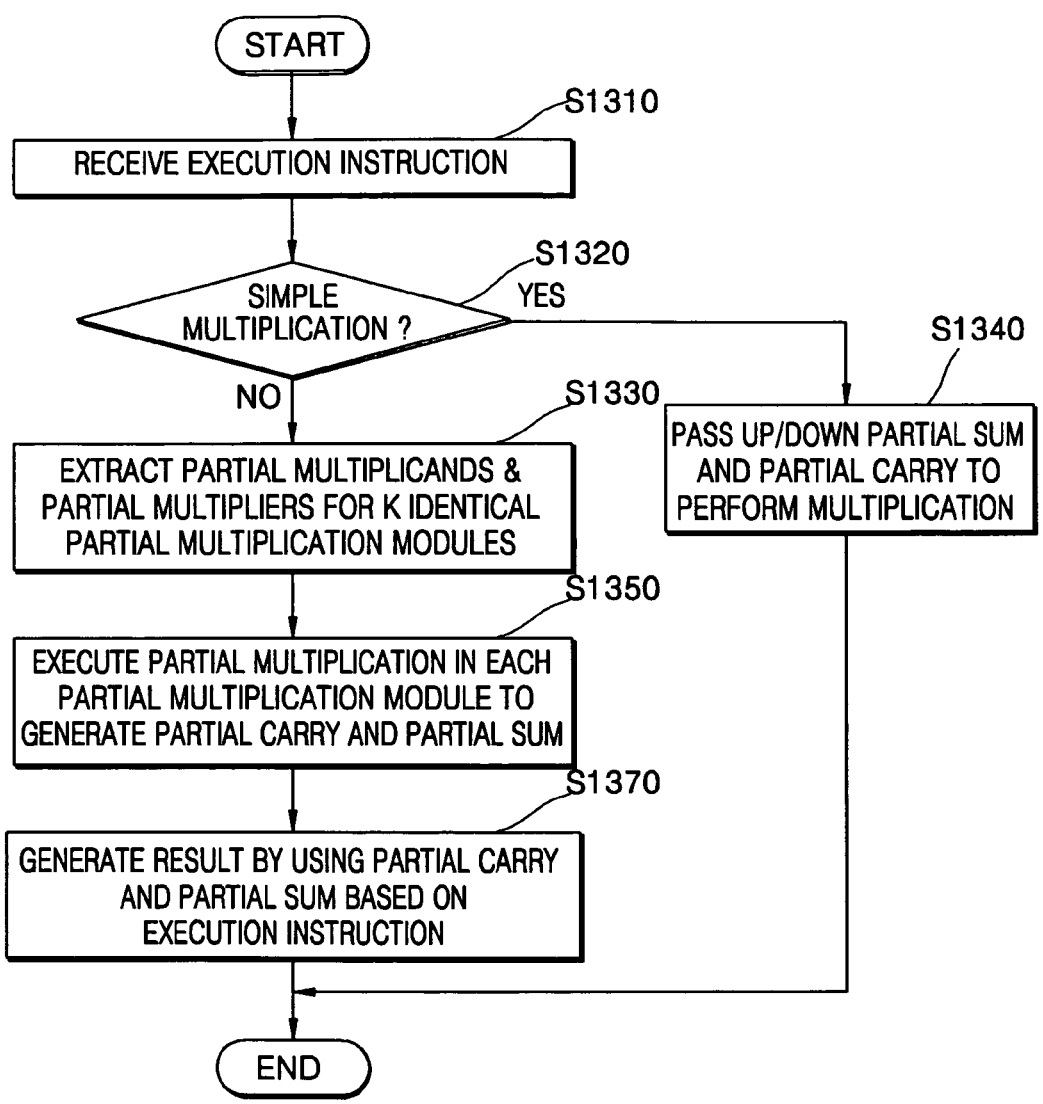
FIG. 13 is a flowchart illustrating a multiple multiplication method according to an embodiment of the present invention.

FIG. 13 is a flowchart illustrating a multiple multiplication method according to an embodiment of the present invention.

First, an execution instruction is received in step S1310. Then, the execution instruction is decoded and a required multiplication is selected.

In step S1320, it is determined whether the execution instruction indicates a simple multiplication order. As noted above, although exemplary embodiments of the present invention are shown applied to a simple multiplication, the present invention is not restricted to simple multiplications only. Accordingly, if it is not a simple multiplication, the method proceeds to step S1330 to perform various multiple multiplications. If it is a simple multiplication, the method proceeds to step S1340 to perform the multiplication.

In step S1330, partial multipliers and partial multiplicands to be provided to k partial multiplication modules are extracted according to the decoded execution instruction. As noted above, partial multipliers and partial multiplicands are divided and/or combined in various ways and provided to the partial multiplication modules.

The partial multiplication modules then generate partial carries and partially multiplied results in step S1350. The partial carries and partially multiplied results are provided to an output generator in a vector form. Then, the output generator combines the carry vector and the partial multiplied result vector based on the execution instruction and generates a final result in step S1370.

When the execution instruction indicates a simple multiplication order, the method proceeds to a simple multiplication operation at step S1340. In step S1340, some bits of partial products and partial carries are passed up and down considering the multiplication coverages of each partial multiplication module. Resulting partial products and partial carries are then simply combined to generate a final output.

Figure 14A:
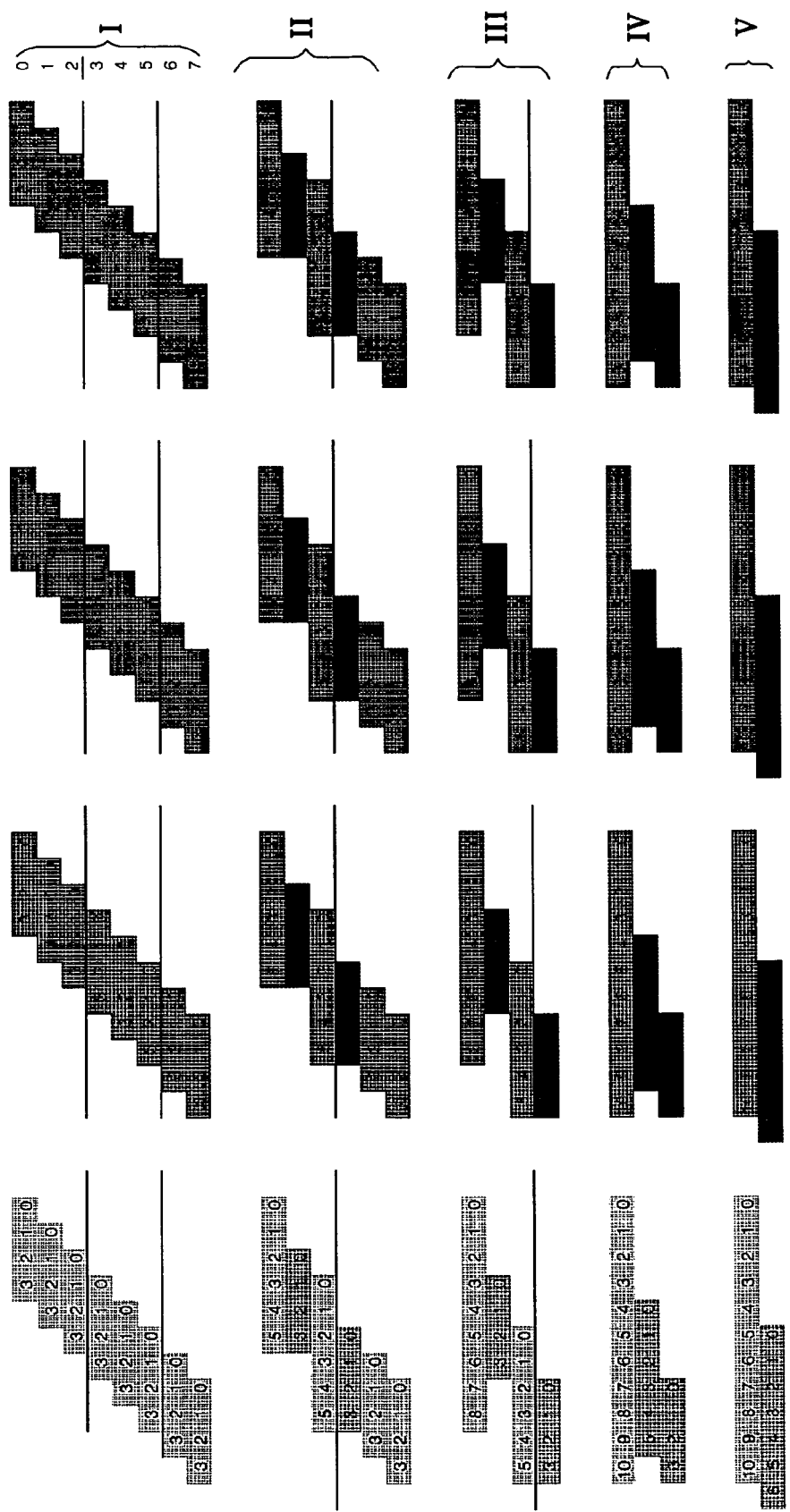
FIG. 14a and FIG. 14b are diagrams to illustrate an adding operation according to a conventional multiplication method.
Figure 14B:
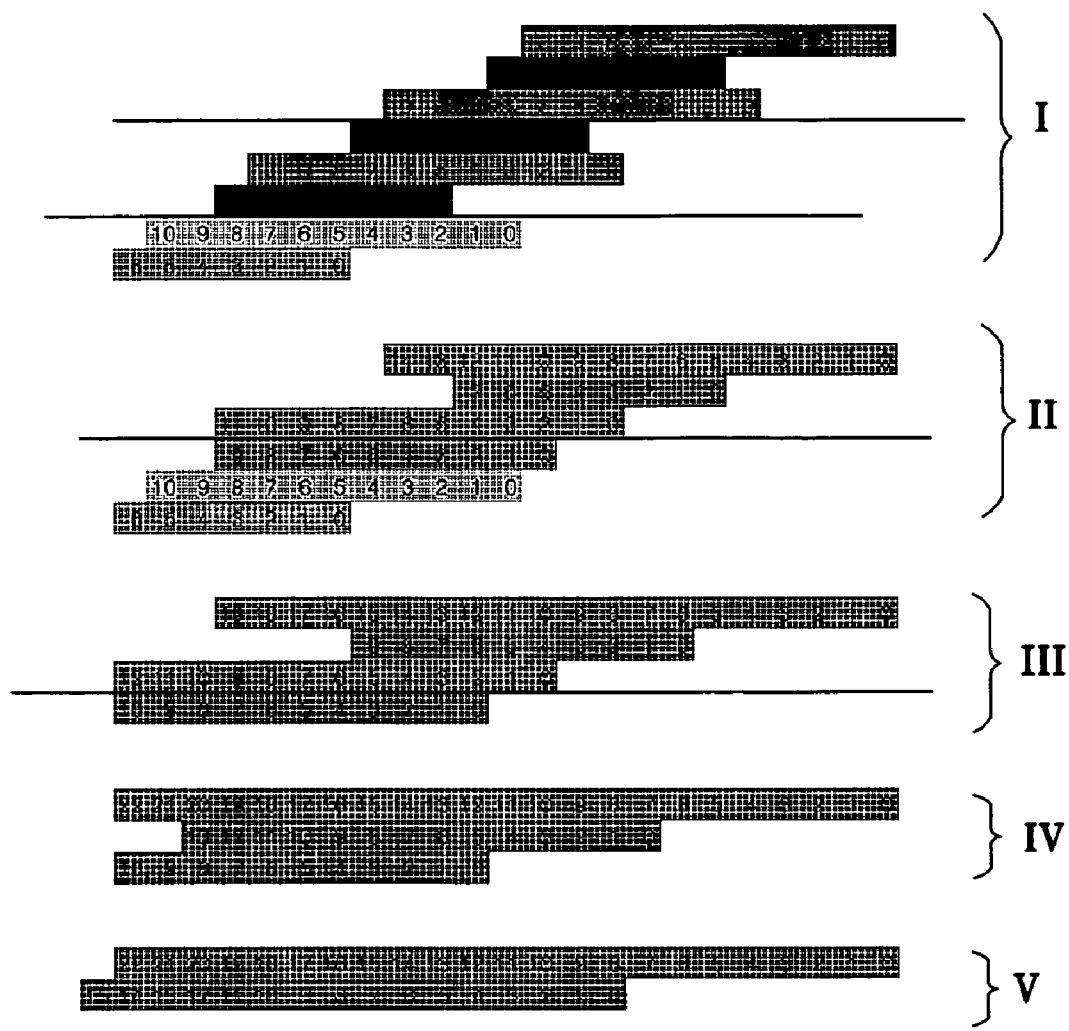

FIG. 14a and FIG. 14b illustrate an adding operation according to a conventional multiplication method.

FIG. 14a illustrates the multiplication of a 16-bit multiplicand by an 8-bit multiplier. The 16-bit multiplicand is divided into four 4-bit multiplicands for partial multiplication. Each partial multiplicand is bit-wise multiplied by the multiplier to form inside multiplication vectors. To simplify the explanation, the operation of FIG. 14a is divided to steps I, II, III, IV and V.

Figure 1:
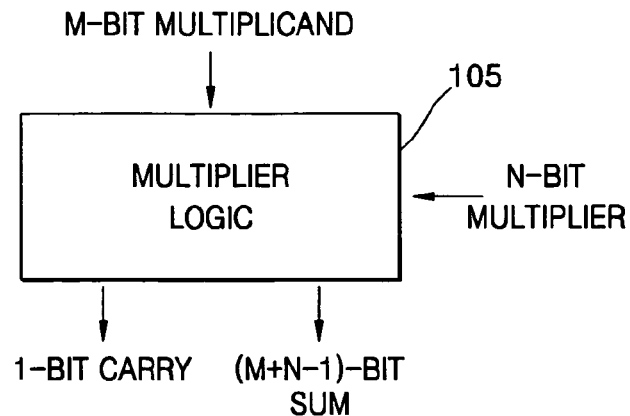
FIG. 1 is a diagram to illustrate the operation of a conventional multiplication module.
Figure 2:
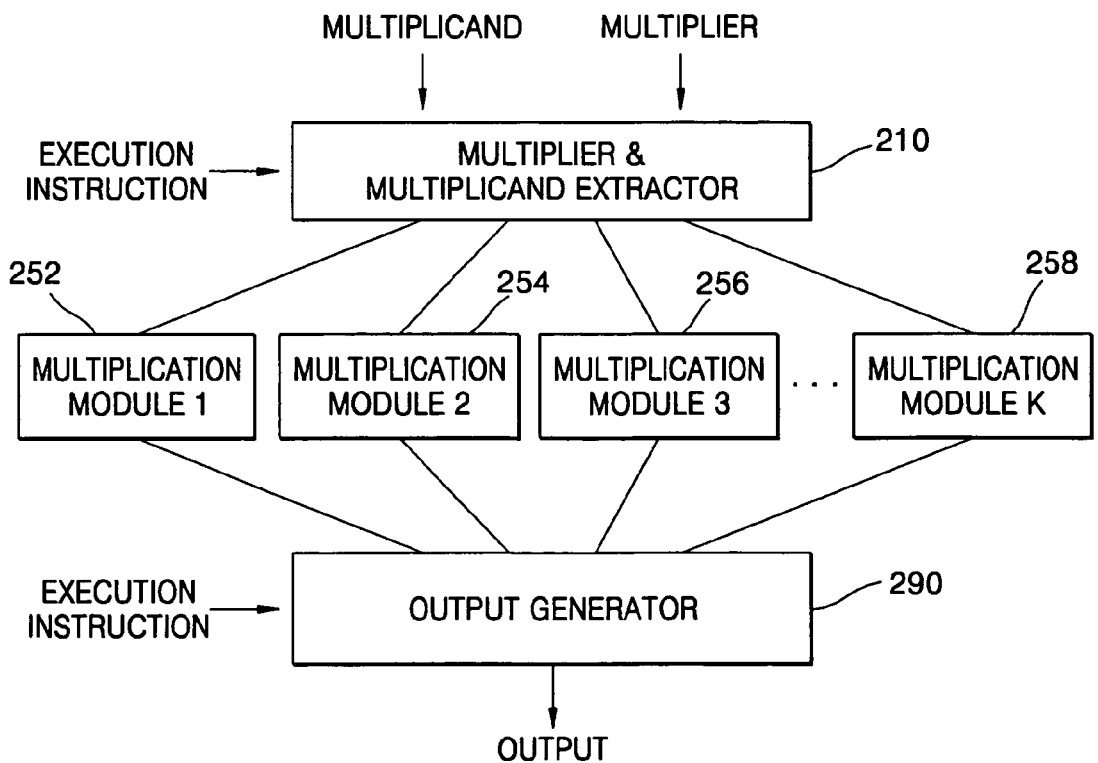
FIG. 2 is a block diagram illustrating a conventional multiple multiplication apparatus.
Figure 3:
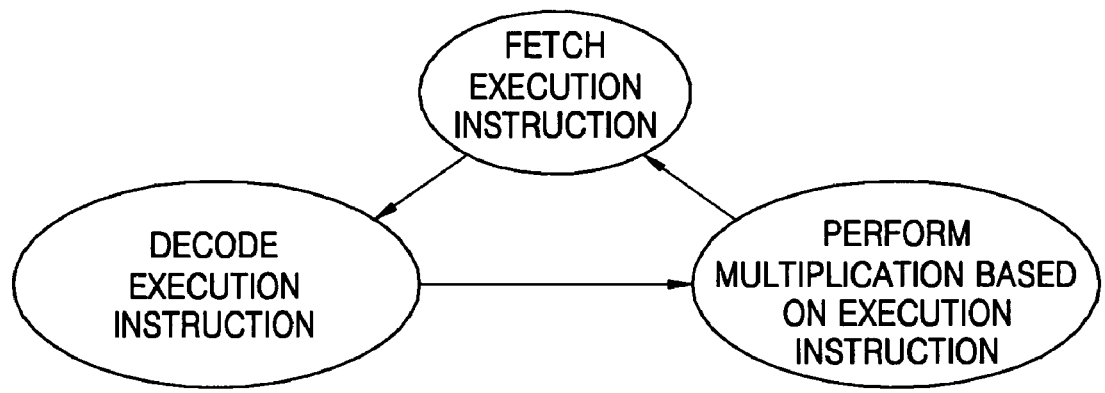
FIG. 3 is a flow chart to show the multiplication operation performed in a conventional multiple multiplication apparatus.
Figure 4:
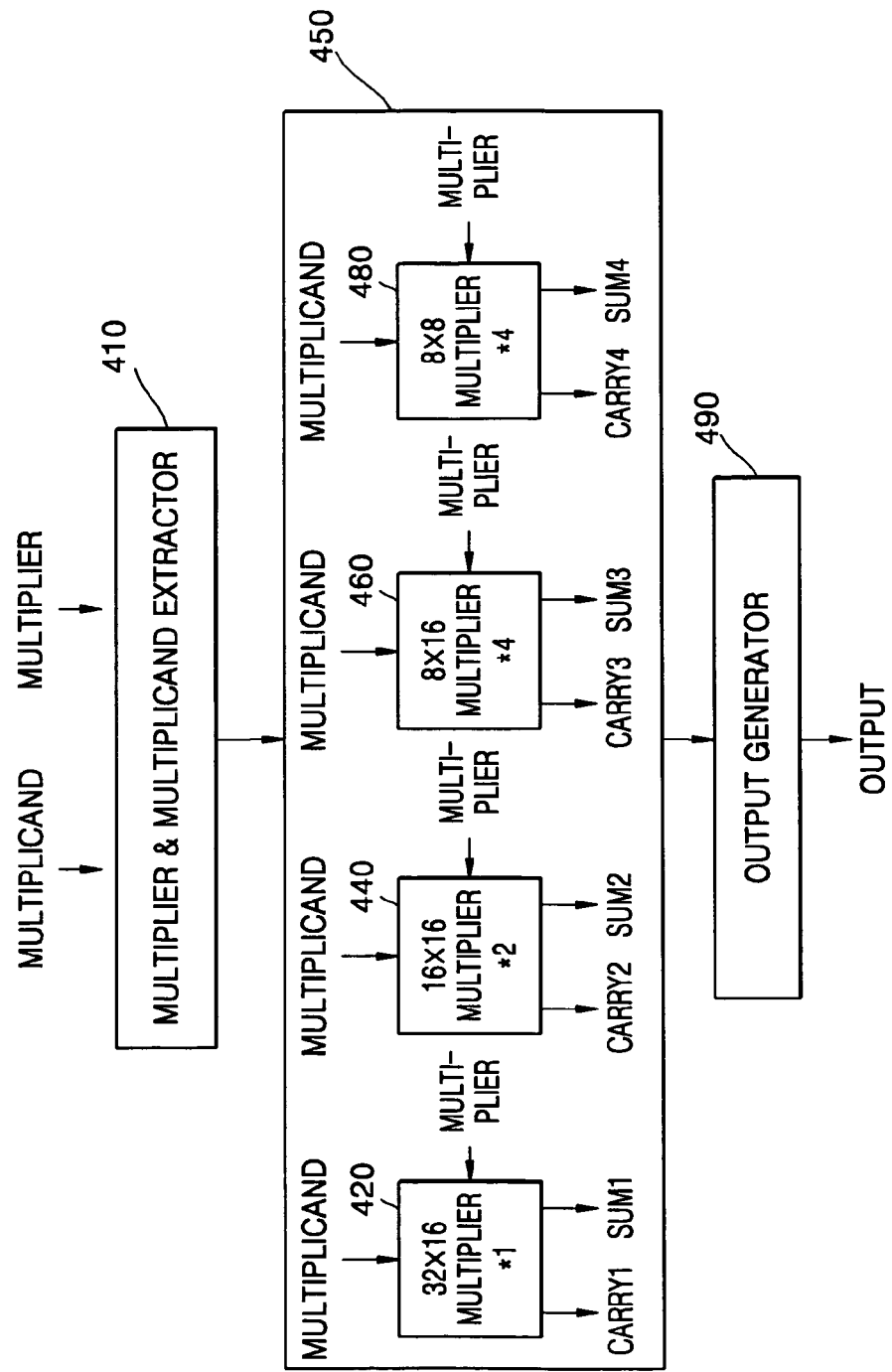
FIG. 4 is a block diagram illustrating the operation of the conventional multiple multiplication apparatus in greater detail.

As illustrated in FIG. 14a, 2 adders are required per multiplicand in step I. Also, 2 adders are required in step II, and one adder is required in each of steps III and IV.

Therefore, a total of 6*4=24 adders are required to perform the operation illustrated in FIG. 14a.

FIG. 14b illustrates an operation following the operation shown in FIG. 14a.

In FIG. 14b, the operation is divided into steps I, II, III, IV and V as in FIG. 14a.

As illustrated in FIG. 14b, 2 adders are required per multiplicand in step I. Also, 2 adders are required in step II and one adder is required in each of steps III and IV. Therefore, a total of 6 adders are required to perform the operation illustrated in FIG. 14b.

As a result, 24+6=30 adders are required to perform the operations illustrated in FIGS. 14a and 14b.

Figure 14C:
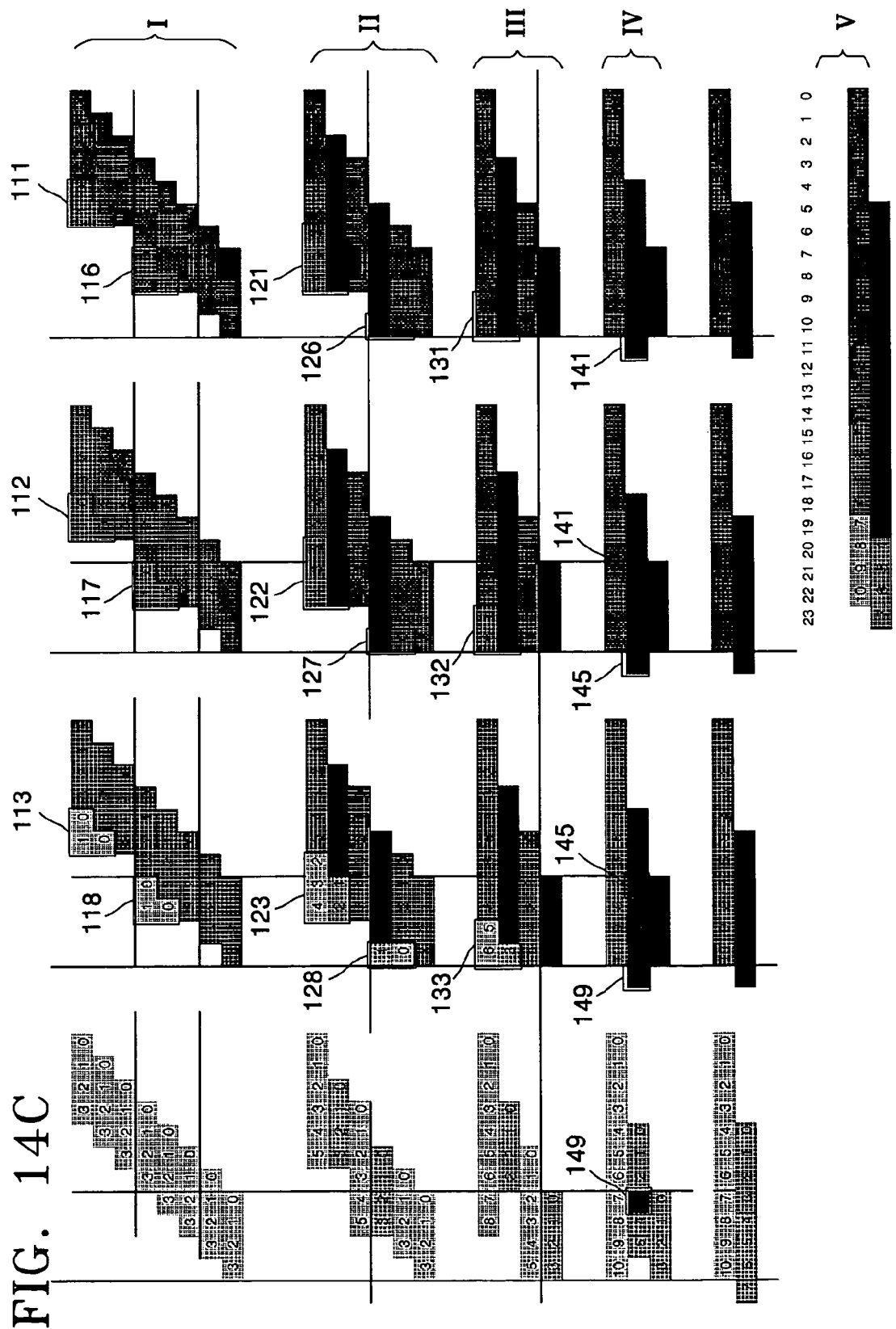
FIG. 14c is a diagram to illustrate a multiplication process of a multiple multiplication method according to an embodiment of the present invention in greater detail.

FIG. 14c illustrates a multiplication process of a multiple multiplication method according to an embodiment of the present invention in greater detail.

For comparison with FIGS. 14a and 14b, the multiplication operation example shown in FIG. 14c also multiplies a 16-bit multiplicand by an 8-bit multiplier. To perform the adding operation of step I, 8 adders are required. In each adding operation, partial sums are passed down to make the MSBs of the inside multiplication vectors to be added, each have the same order. For example, a bit set 111 is passed down from a second partial multiplication module, a bit set 112 is passed down from a third partial multiplication module, and a bit set 113 is passed down from a fourth partial multiplication module. Similarly, a bit set 116 is passed down from a second partial multiplication module, a bit set 117 is passed down from a third partial multiplication module, and a bit set 118 is passed down from a fourth partial multiplication module. It is to be noted that the bit sets are passed down to make the inside multiplication vectors have the same order MSBs.

To perform the adding operation of step II, 8 adders are required. As in step I, a bit set 121 is passed down from a second partial multiplication module, a bit set 122 is passed down from a third partial multiplication module, and a bit set 123 is passed down from a fourth partial multiplication module. Similarly, a bit set 126 is passed down from a second partial multiplication module, a bit set 127 is passed down from a third partial multiplication module, and a bit set 128 is passed down from a fourth partial multiplication module.

To perform the adding operation of step III, bit sets 131, 132 and 133 are also passed down from the second, third and fourth partial multiplication modules, respectively. In step III, 4 adders are required.

In step IV, bits 141, 145 and 149 of partial carries exceeding corresponding multiplication coverage, are passed up to the second, third and fourth partial multiplication modules, respectively. In step IV, 4 adders are required.

In step V, the partial products are simply combined considering the corresponding multiplication coverages to obtain the final result. No adder is required in step V since there is no adding operation.

Therefore, only 25 adders required to perform the operation shown in FIG. 14c in accordance with an embodiment of the present invention.

By using the present invention, a multiple multiplication apparatus is provided which performs various multiplications with a reduced size.

Also, power consumption is reduced since the number of logic gates used in the multiple multiplication apparatus is also reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A multiplication apparatus having a plurality of identical partial multiplication modules, for receiving a multiplicand having m bits, wherein m is a positive integer, and a multiplier having n bits, wherein n is a positive integer, and for performing multiplication according to an execution instruction to generate a multiplication output, the multiplication apparatus comprising:

a multiplier and multiplicand extractor for dividing each multiplicand into k partial multiplicands, wherein k is a positive number, dividing each multiplier into l partial multipliers, wherein l is a positive number, and generating k partial input pairs by combining the partial multiplicands with the respective partial multipliers;

a multiplication executor including k identical partial multiplication modules, each for receiving one of the k partial input pairs and outputting one partial carry and one partial product by multiplying the partial multiplicand by the partial multiplier in the received partial input pair; and an output generator configured to selectively execute a Carry Save Adder (CSA) algorithm and an addition operation for combining k partial carries with k partial products according to the execution instruction to generate a final output.

2. The multiplication apparatus of claim 1, wherein the multiplier and multiplicand extractor is further configured to:

determine whether the multiplication indicated by the execution instruction is an unsigned multiplication and in response, deactivate sign bits of the partial multiplicands and the partial multipliers to 0 when the multiplication is determined to be an unsigned multiplication, and perform sign-extension on an MSB of a final result by adding sign bits to the partial multiplicands and the partial multipliers when the multiplication is determined to be a signed multiplication.

3. The multiplication apparatus of claim 2, wherein the multiplier and multiplicand extractor is further configured to:

divide the multiplicand into k partial multiplicands MCD (1), MCD(2), . . . ,MCD(k), each having a size of m/k bits, in a descending order from a most significant bit (MSB) to a least significant bit (LSB) of the multiplicand, divide the multiplier into l partial multipliers MER(1), MER(2), . . . ,MER(l), each having a size of n/l bits, in a descending order from a most significant bit (MSB) to a least significant bit (LSB) of the multiplier, and generate partial input pairs by combining a p-th partial multiplicand with a q-th multiplier, wherein p is an integer that satisfies p≦k and q is an integer that satisfies q≦l, and increase p and q by 1 until p reaches k or until q reaches l.

4. The multiplication apparatus of claim 3, wherein the multiplier and multiplicand extractor is further configured to initialize p and q after p reaches k or after q reaches l.

5. The multiplication apparatus of claim 3, wherein the partial multiplication modules are configured to provide the partial carries and the partial products to the output generator in a vector form.

6. The multiplication apparatus of claim 5, wherein the output generator is configured to:
sequentially shift each of the partial products by an amount of (a bit number required by the execution instruction—a bit number of the partial product)/k, and
generate the final output by performing adding on the shifted partial products.

7. The multiplication apparatus of claim 1, wherein when the multiplication indicated by the execution instruction is simple multiplication, each of the partial multiplication modules further comprise respective multiplication coverages and are configured to:
use a plurality of inside multiplication vectors, wherein the inside multiplication vectors are generated by a bit-wise multiplying of the partial multiplicand by the partial multiplier and are passed down from an adjacent partial multiplication module having a multiplication coverage higher than the multiplication coverage of the receiving partial multiplication module, to calculate the partial carry and the partial product, and
pass up bits of the partial carry exceeding the multiplication coverage of the sending partial multiplication module to an adjacent partial multiplication module having a higher multiplication coverage.

8. The multiplication apparatus of claim 7, wherein the output generator is configured to:
combine the partial products received from each of the partial multiplication modules according to corresponding multiplication coverages to generate the final output.

9. The multiplication apparatus of claim 7, wherein each of the partial multiplication modules further comprise:
an adder for adding inside multiplication vectors, wherein the adder is further configured to pad the inside multiplication vector with the inside multiplication vector passed down from the adjacent partial multiplication module having a higher multiplication coverage to make the inside multiplication vectors have the same order of most significant bits (MSBs), and
wherein the adder is further configured to add the padded inside multiplication vectors.

10. The multiplication apparatus of claim 9, wherein the multiplication coverages comprise a lowest multiplication coverage of [0, n+m/k−2] and a remaining plurality of multiplication coverages having a size of m/k bits in an increasing order from a bit adjacent to an MSB of an adjacent lower multiplication coverage.

11. The multiplication apparatus of claim 10, wherein the multiplier and multiplicand extractor is further configured to:
divide the multiplicand into k partial multiplicands MCD (1), MCD(2), . . . ,MCD(k), each having a size of m/k bits, in a descending order from the MSB to the LSB, and
generate partial input pairs by combining a p-th partial multiplicand with a q-th multiplier, wherein p is an integer that satisfies p≦k and q is an integer that satisfies q≦l, and increase p and q by 1 until p reaches k or until q reaches l.

12. A method for controlling a number of identical partial multiplication modules of a multiplication apparatus for use with a multiplicand having m bits, wherein m is a positive integer, and a multiplier having n bits, wherein n is a positive integer, according to an execution instruction to generate a final output, the method comprising the steps of:
controlling an extractor of the multiplication apparatus for extracting a multiplier and a multiplicand;
controlling the extractor of the multiplication apparatus for dividing each multiplicand into k partial multiplicands, wherein k is a positive number;
controlling the extractor of the multiplication apparatus for dividing each multiplier into l partial multipliers, wherein l is a positive number;
controlling the extractor of the multiplication apparatus for generating k partial input pairs by combining the partial multiplicands with the respective partial multipliers;
controlling k identical partial multiplication modules of the multiplication apparatus, each for receiving one of the k partial input pairs and outputting one partial carry and one partial product by multiplying the partial multiplicand by the partial multiplier in the received partial input pair;
controlling the partial multiplication modules of the multiplication apparatus for outputting k partial carries and k partial products; and
controlling an output generator of the multiplication apparatus to selectively execute a Carry Save Adder (CSA) algorithm and an addition operation for generating a final output by combining the k partial carries with the k partial products according to the execution instruction.

13. The method of claim 12, wherein the step of controlling the extractor of the multiplication apparatus for extracting a multiplier and a multiplicand comprises the steps of:
determining whether the multiplication indicated by the execution instruction is unsigned multiplication;
deactivating sign bits of the partial multiplicands and the partial multipliers to 0 when the multiplication is determined to be unsigned multiplication; and
performing sign extension on an MSB of a final result by adding sign bits to the partial multiplicands and the partial multipliers when the multiplication is determined to be signed multiplication.

14. The method of claim 13, wherein the step of controlling the extractor of the multiplication apparatus for extracting a multiplier and a multiplicand further comprises the steps of:
dividing the multiplicand into k partial multiplicands MCD (1), MCD(2), . . . ,MCD(k), each having a size of m/k bits, in a descending order from a most significant bit (MSB) to a least significant bit (LSB) of the multiplicand;
dividing the multiplier into l partial multipliers MER(1), MER(2), . . . ,MER(l), each having a size of n/l bits, in a descending order from the most significant bit (MSB) to a least significant bit (LSB) of the multiplier;
generating partial input pairs by combining a p-th partial multiplicand with a q-th multiplier, wherein p is an integer that satisfies p≦k and q is an integer that satisfies q≦l;
increasing p and q by 1 until p reaches k or until q reaches l; and
initializing p and q when p reaches k or q reaches l.

15. The method of claim 14, wherein the step of controlling the partial multiplication modules of the multiplication apparatus for performing multiplication to perform a partial multiplication operation provides the partial carries and the partial products to the output generator in a vector form.

16. The method of claim 15, wherein the step of controlling the output generator of the multiplication apparatus for generating a final output further comprises the steps of:

sequentially shifting each of the partial products by an amount of (a bit number required by the execution instruction—a bit number of the partial product)/k; and generating the final output by performing adding on the shifted partial products.

17. The method of claim 12, wherein when the multiplication indicated by the execution instruction is simple multiplication, the method further comprises the steps of:

controlling each of the partial multiplication modules of the multiplication apparatus for partial multiplication operations having respective multiplication coverages to use inside multiplication vectors, wherein each of which is generated by a bit-wise multiplying of the partial multiplicand by the partial multiplier and are passed down from an adjacent partial multiplication operation having a multiplication coverage higher than the multiplication coverage of the receiving partial multiplication operation, to calculate the partial carry and the partial product;

further controlling each of the partial multiplication modules of the multiplication apparatus for partial multiplication operations to pass up bits of the partial carry exceeding the multiplication coverage of the sending partial multiplication module to an adjacent partial multiplication operation having a higher multiplication coverage; and controlling the output generator of the multiplication apparatus for generating the final output by combining the partial products received from each of the partial multiplication operations according to corresponding multiplication coverages.

18. The method of claim 17, further comprising the steps of:

controlling an adder of the partial multiplication modules of the multiplication apparatus for adding inside multiplication vectors, wherein the adding of the inside multiplication vectors operation pads the inside multiplication vectors with the partial product passed down from the adjacent partial multiplication operation having a higher multiplication coverage to make the inside multiplication vectors have the same order of most significant bits (MSBs); and controlling the adder of the partial multiplication modules of the multiplication apparatus for adding the padded inside multiplication vectors.

19. The method of claim 18, further comprising the step of defining the multiplication coverages such that the lowest multiplication coverage is [0, n+m/k−2] and a remaining plurality of multiplication coverages have a size of m/k bits in an increasing order from a bit adjacent to an MSB of an adjacent lower multiplication coverage.

20. The method of claim 18, further comprising the steps of:

controlling the extractor of the multiplication apparatus for dividing the multiplicand into k partial multiplicands MCD(1), MCD(2), . . . ,MCD(k), each having a size of m/k bits, in a descending order from the MSB to the LSB; and controlling the extractor of the multiplication apparatus for generating partial input pairs by combining a p-th partial multiplicand with a q-th multiplier, wherein p is an integer that satisfies p≦k and q is an integer that satisfies q≦l, and increasing p and q by 1 until p reaches k or until q reaches l.

* * * * *